Oct. 29, 1929.　　　P. R. HOOPES　　　1,733,263
HEATING AND FORGING MEANS
Filed Sept. 2, 1927　　8 Sheets-Sheet 1

Inventor
Penrose R. Hoopes
By his Attorney
Edward M. Evarts

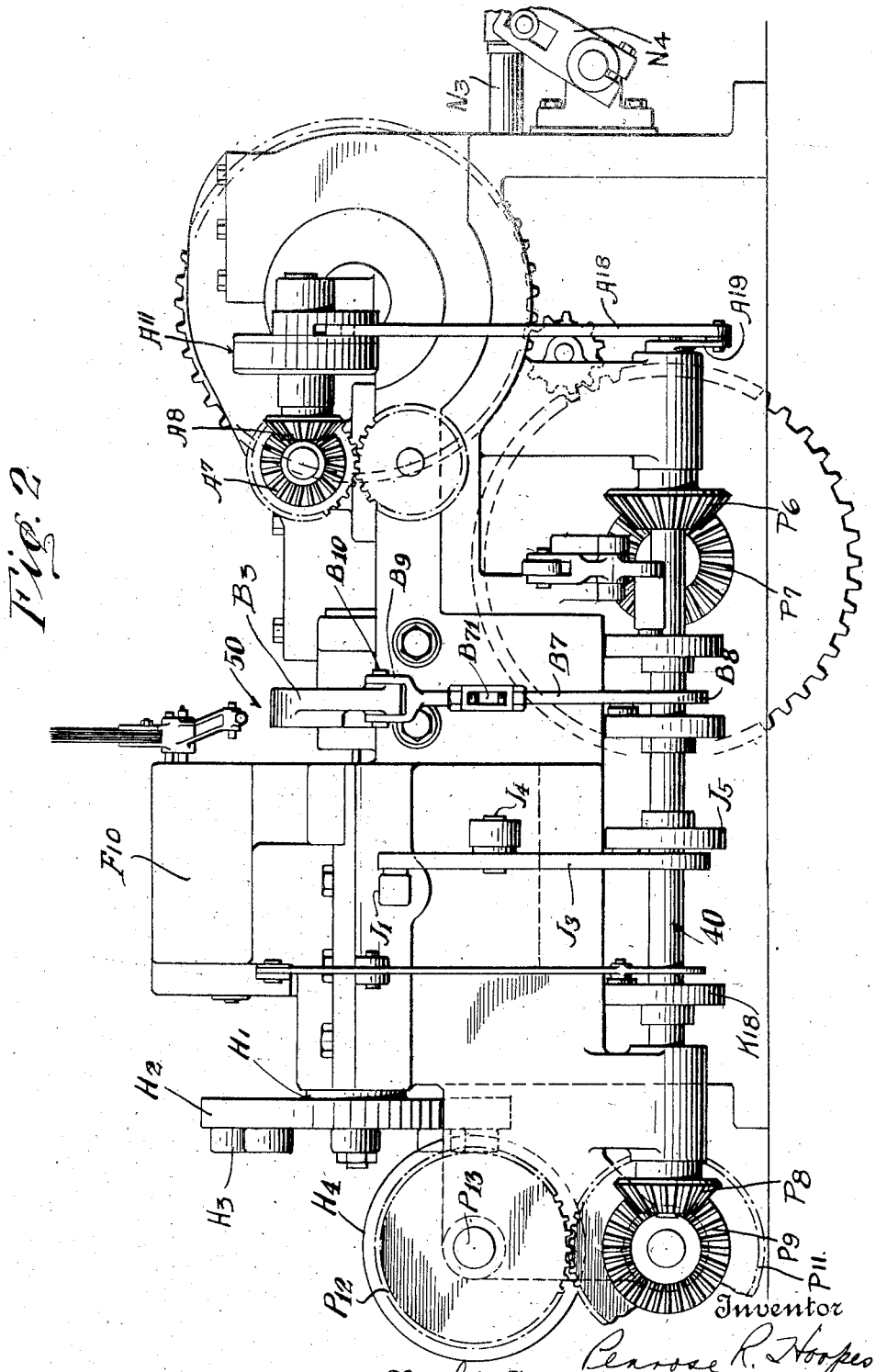

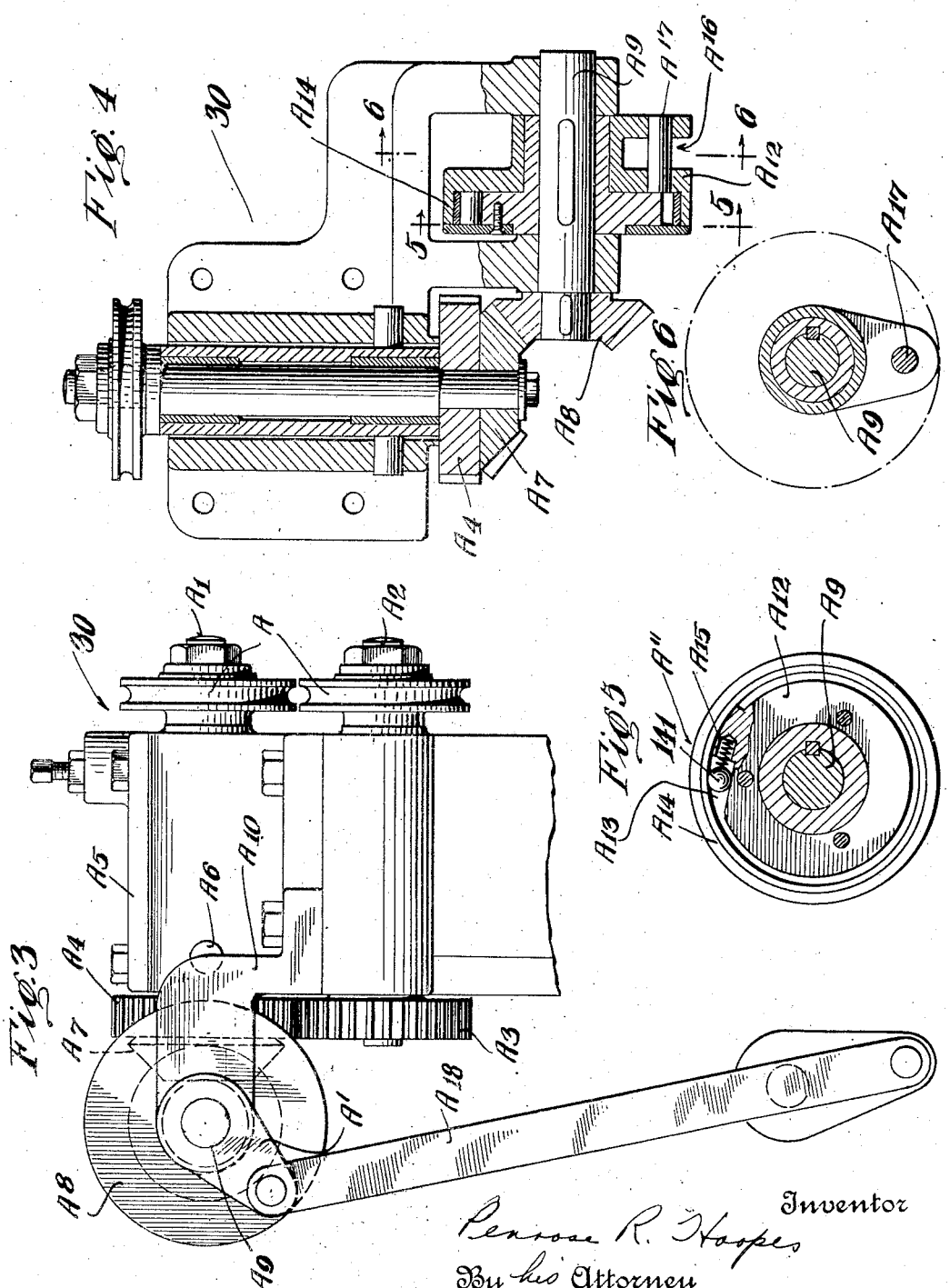

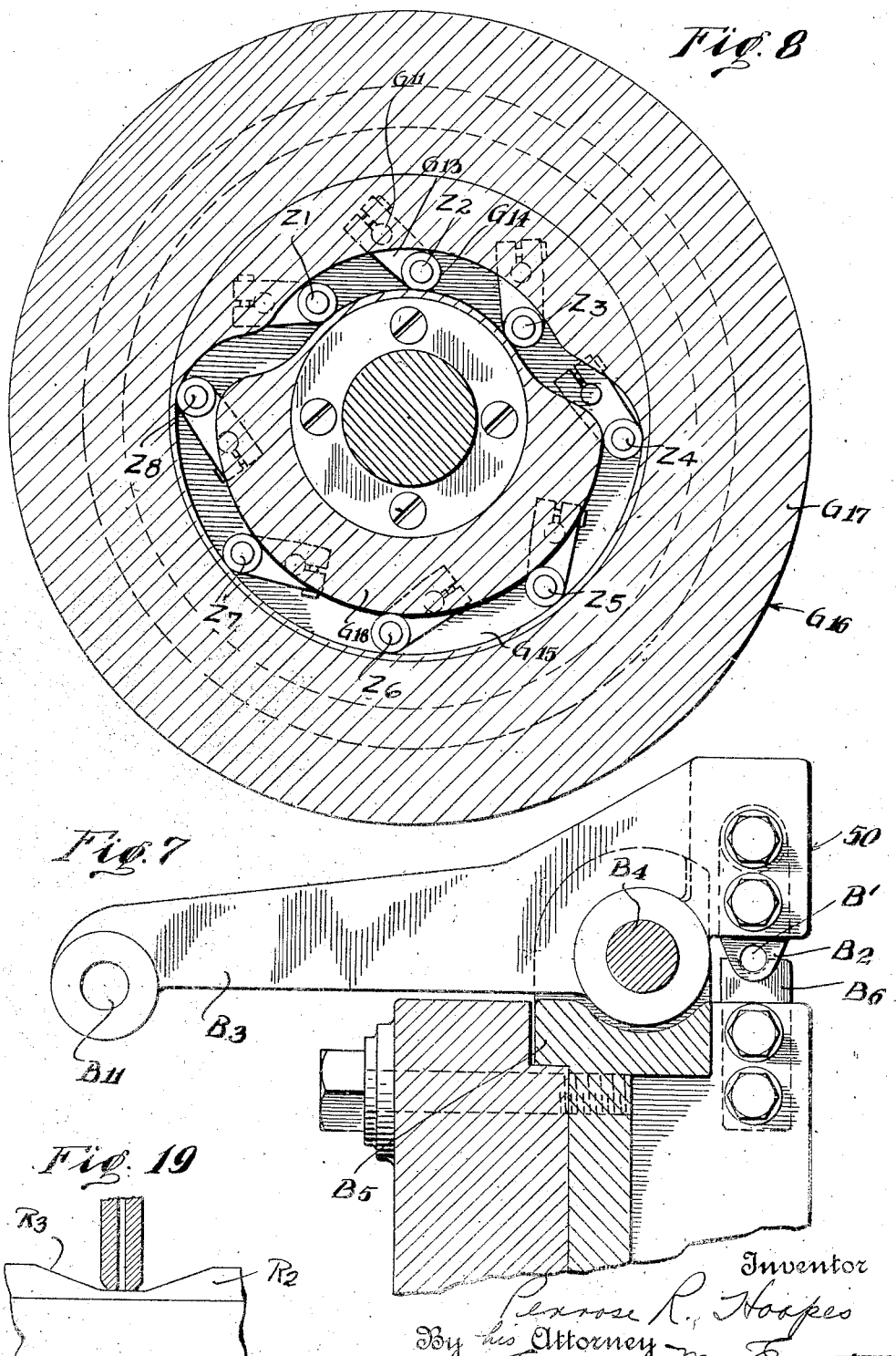

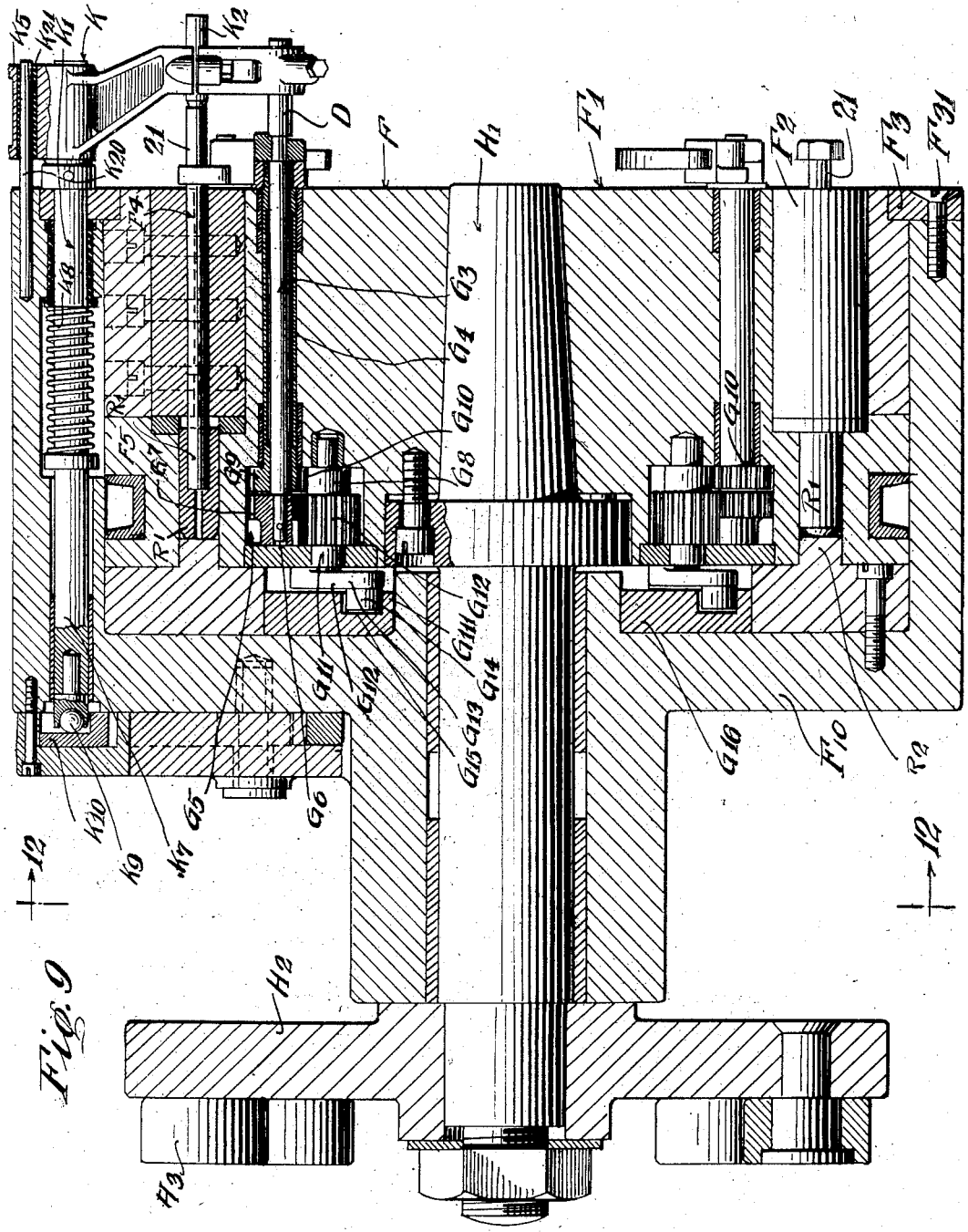

Oct. 29, 1929.                P. R. HOOPES                1,733,263
                         HEATING AND FORGING MEANS
                    Filed Sept. 2, 1927        8 Sheets-Sheet 6
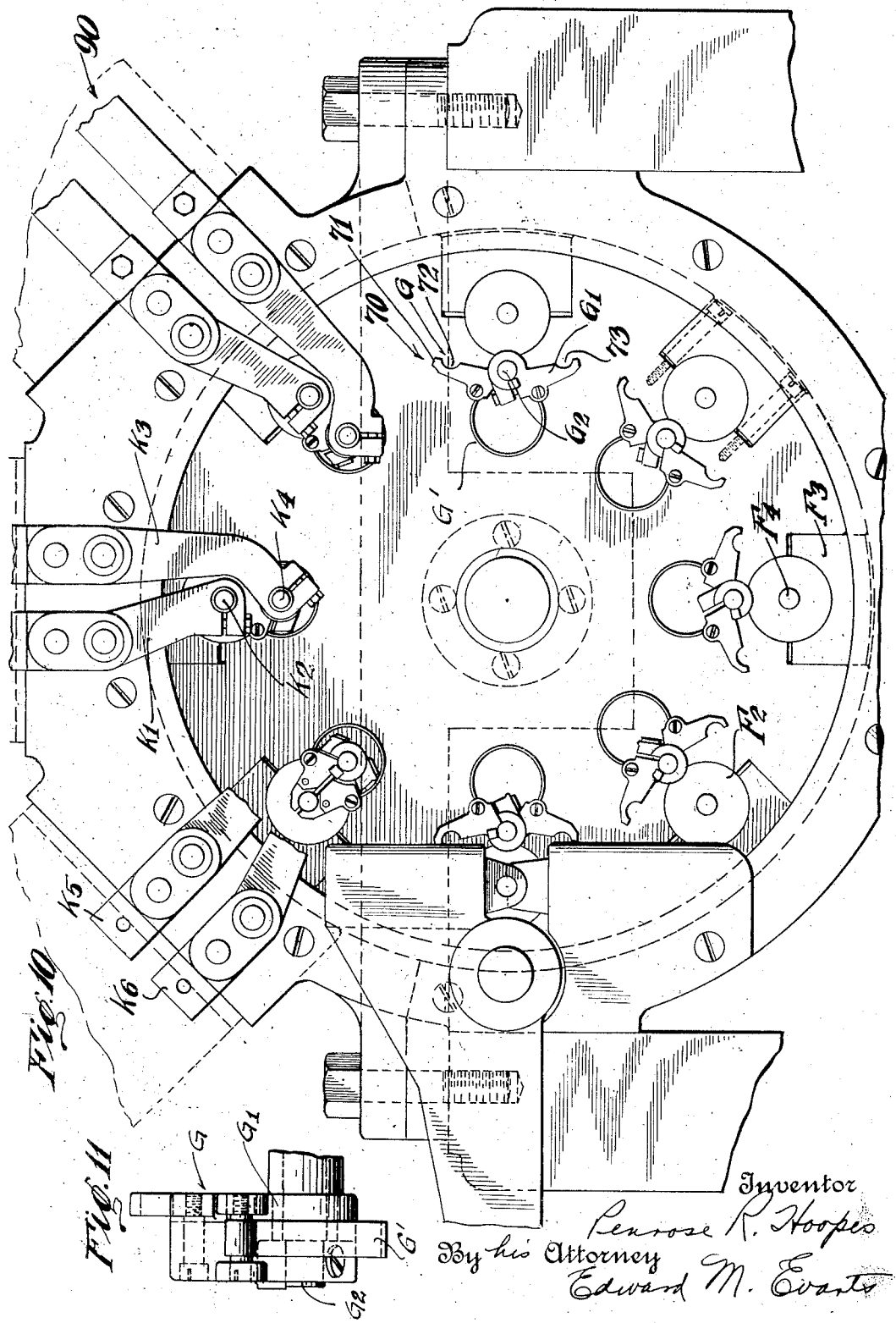
Inventor
Penrose R. Hoopes
By his Attorney
Edward M. Evarts

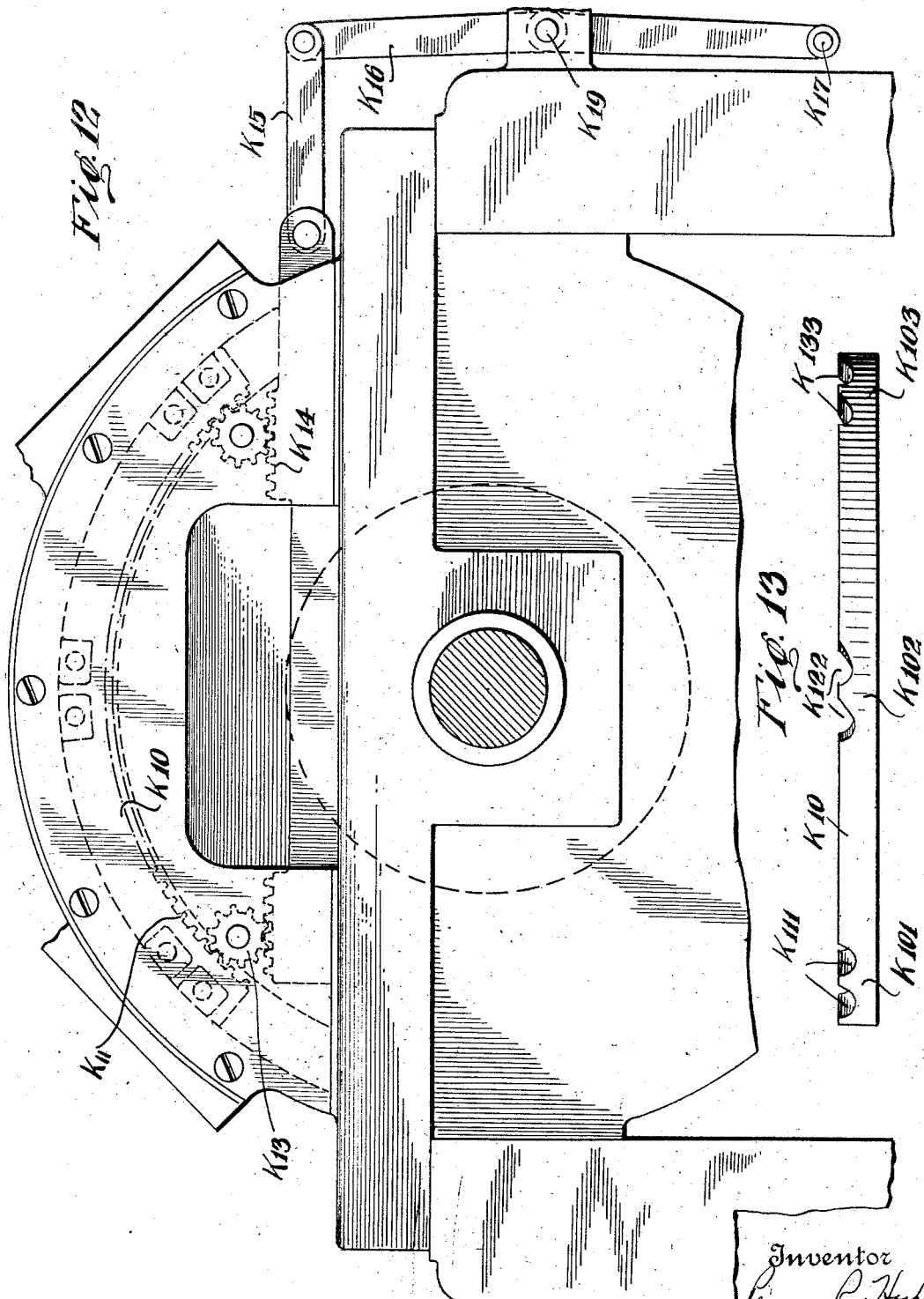

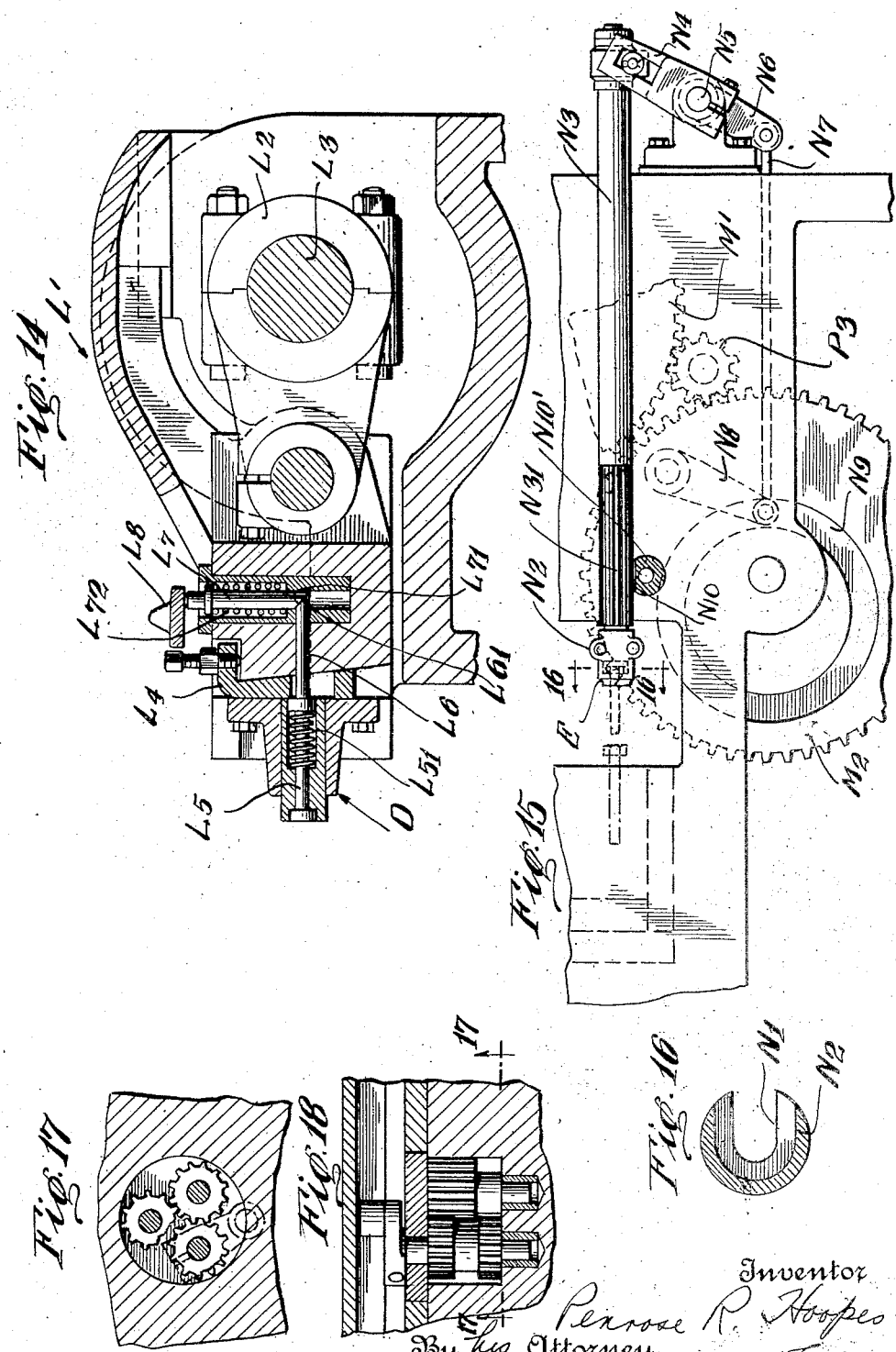

Patented Oct. 29, 1929

1,733,263

UNITED STATES PATENT OFFICE

PENROSE R. HOOPES, OF HARTFORD, CONNECTICUT, ASSIGNOR TO ELEKTROMATIK FORGING MACHINE CORPORATION, A CORPORATION OF NEW YORK

HEATING AND FORGING MEANS

Application filed September 2, 1927. Serial No. 217,121.

My present invention relates to machines for heating and forging metal articles, particularly where the heating operation is carried out electrically, and aims to devise machines of the general character specified which are simple in construction, which may be readily and economically fabricated and assembled, and which are adapted to carry out the desired heating and forging operations in a highly convenient, economical and expeditious manner. It is a further object of the present invention to devise machines which permit the use of a continuous metal member, such as a metal rod, wire, strip, ribbon or the like, out of which the blanks for the various metal articles may be conveniently produced during the fabrication of the metal article itself. Other objects and advantages of the machines of the present invention will in part be pointed out in detail hereinafter and will in part be obvious to those skilled in the art to which the present invention relates.

In the accompanying specification I shall describe, and in the annexed drawing show, an illustrative embodiment of the present invention. It is, however, to be clearly understood that my invention is not limited to the specific embodiment thereof herein shown and described for purposes of illustration only. It may here further be stated that the machine will be described in connection with one method of fabricating the articles which may be made in the machine, by way of example merely, it being further understood that the machine is not limited to its use with the method herein described, such method forming no part of the present invention but being more fully described and being fully claimed in a copending application of mine filed of even date herewith Serial No. 217,212 and entitled "Heating and forging methods."

Referring now to the aforesaid illustrative embodiment of the present invention, and more particularly to the drawing illustrating the same:

Fig. 2 is a side view of the machine, some of the parts being likewise omitted for a similar purpose;

Fig. 3 is an end view of the feeding mechanism;

Fig. 4 is a view, partially in section and partly in elevation, showing certain portions of the machine in detail;

Fig. 5 is a cross-sectional view taken along line 5—5 of Fig. 4 of the drawing;

Fig. 6 is a cross-sectional view taken along line 6—6 of Fig. 4 of the drawing;

Fig. 7 is a view, partly in elevation and partly in cross section, showing the shearing mechanism;

Fig. 8 is a cross-sectional view, partly in elevation, through the revolving head showing the cam way for moving the jaws forming a part of the machine;

Fig. 9 is a vertical sectional view, partly in elevation, through the dial head;

Fig. 10 is a front elevation, partly broken away, showing the dial head;

Fig. 11 is a detailed view showing certain features of the jaw construction;

Fig. 12 is a cross-sectional view, partly in elevation, taken along line 12—12 of Fig 9 of the drawing;

Fig. 13 is a detailed edge view of one of the cams forming a part of the machine;

Fig. 14 is a vertical sectional view through the punch or forging head;

Fig. 15 is a side elevation of the mechanism for removing the finished article;

Fig. 16 is a sectional view taken along line 16—16 of Fig. 15 of the drawing;

Fig. 17 is a sectional view taken along line 17—17 of Fig. 18 of the drawing;

Fig. 18 is a sectional view taken through the jaw-operating mechanism; and

Figure 19 is a detail showing of Figure 9. illustrating how the pin $R_1$ is elevated so as to partly eject the forged article from the die.

Figure 1:
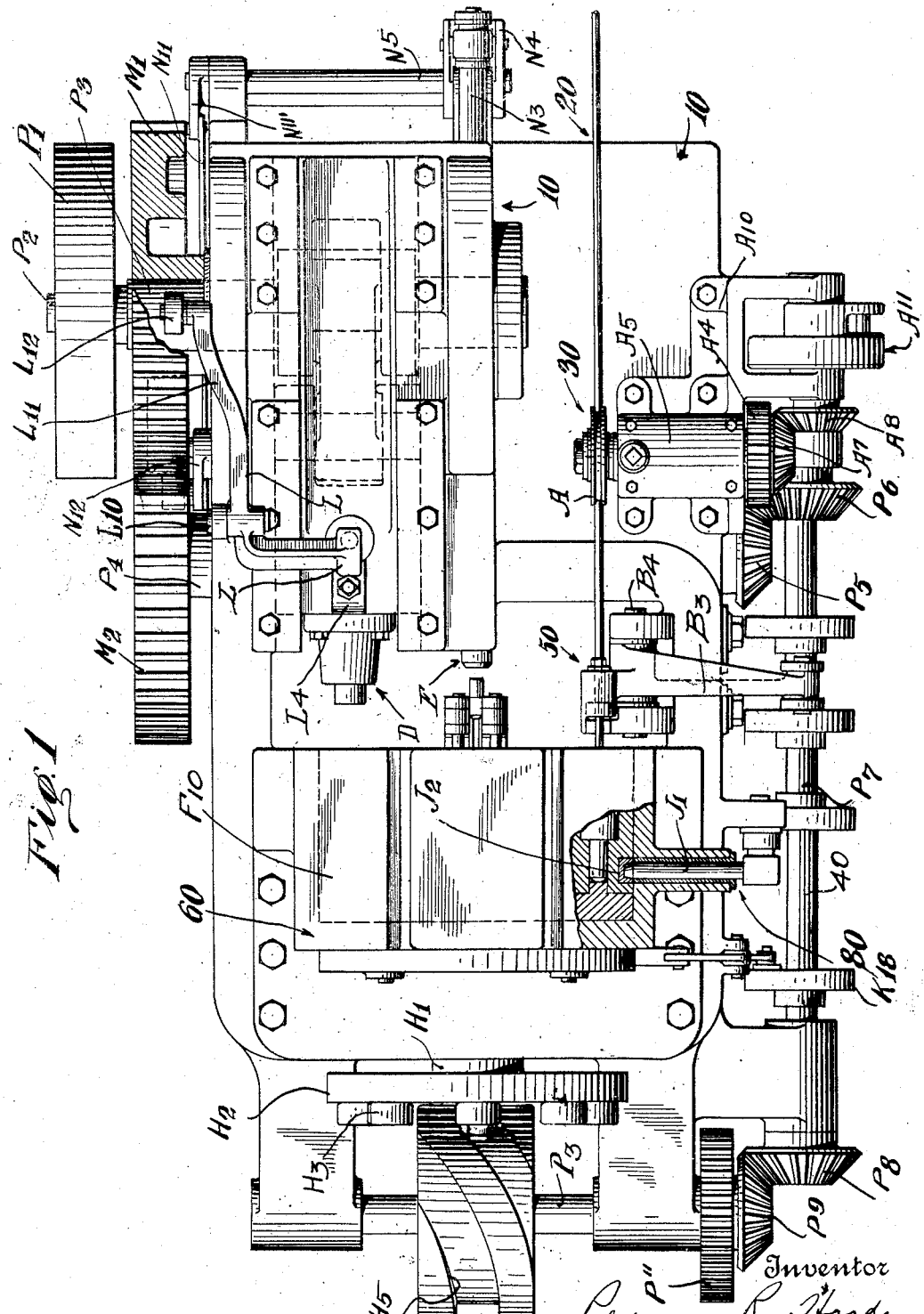
Fig. 1 is a plan view of said machine, certain parts being omitted to make the showing clearer.

Before describing the aforesaid machine, it may be desirable briefly to outline the method which may be conveniently practised with the form of machine shown in the drawings and described in the specification. Such method comprises principally the following series of operations:

The first step of the method, according to its aforesaid embodiments, may comprise the production of a series or succession of metal blanks from which the metal articles are to be made. I do this preferably by shearing a metal member, such as a metal rod, wire, strip, ribbon or the like, into a series of predetermined lengths serving as blanks for the metal articles. In the preferred embodiments of the method, the wire or other preferably continuous metal member is preferably intermittently fed from a reel to the shearing stage or station.

The feeding operation, in such preferred embodiment of the methods of the present invention, preferably brings about the insertion of the free end of the continuous metal member successively into a series of die cavities. It is thereafter and preferably immediately after this insertion has taken place that the shearing operation is carried out. I prefer that the feeding of the metal member into the successive die cavities shall be so effected that the feeding means will slip slightly when the free end of the metal member hits the pin at the bottom of the die cavity. I prefer also that in this position of the sheared length, constituting the blank for the metal article, the same shall be positioned substantially in advance of its final forging position but preferably in a position corresponding substantially to its heating position.

In such heating position, I prefer that the portion of the blank which it is desired to heat to a forging temperature and subsequently to forge shall be positioned well in advance of the surounding die so that the heating operation, which serves to heat the desired portion of the blank to the desired temperature, will not at the same time substantially heat the die so as to destroy its temper and to damage its edges and other accurate parts.

The heating operation is preferably effected by electrical means and preferably in a series of heating stages. That is, instead of heating the desired portion of the blank in one stage to the forging temperature, which would tend to burn the heated end of the blank, I heat the same in a series of stages, that is, the blank is subjected to a series of heating operations each adding its increment of heat to the blank being heated so that ultimately the desired portion of the blank is heated to the desired temperature.

The heating operation being now completed, the heated blank is moved in the die into the forging position, after which the forging operation takes place. I prefer that this movement of the heated blank into the forging position shall be effected and shall be simultaneous with the forging operation. The forged article is now ejected from the die and may thereafter be subjected to any desired grinding, polishing or other finishing operation.

This completes the description of the aforesaid illustrative embodiments of the methods of the present invention. It will be noted that the method is very simple to practise, permits the fabrication of the desired articles from a continuous metal member, and is designed to carry out the desired heating and forging operations in a highly expeditious and economical manner.

The machine illustrated in the drawing embodies a suitable framework generally designated by reference character 10, which suitably supports the various operative portions of the machine. I provide suitable means for feeding the continuous metal member, such as the wire, strip, ribbon, rod or the like, for example the rod designated by reference character 20 in Fig. 1 of the drawing. For this purpose I may employ the feeding means generally designated by reference character 30 in Figs. 1, 3 and 4 of the drawing and comprising, for example, a plurality of cooperating feed rolls A, which are rotatably mounted upon the horizontal parallel shafts $A^1$ and $A^2$, as more clearly shown in Figs. 3 and 4 of the drawing. The shaft $A^2$ is journalled in fixed bearings and rotated by means of a gear wheel $A^3$ mounted on the inner end of the shaft $A^2$, the gear wheel $A^3$ meshing with a gear wheel $A^4$ mounted on the inner end of the shaft $A^1$. The shaft $A^1$ is in turn journalled in bearings $A^5$, the bearings $A^5$ being capable of a slight angular adjustment about a pivot point $A^6$ with respect to the fixed bearings in which the shaft $A^1$ is journalled. In this way the pressure exerted upon the rod 20 by the cooperating feed rolls A may be varied as desired.

The shaft $A^1$ also carries at its inner extremity just beyond the gear wheel $A^4$ a bevel gear $A^7$ meshing with a cooperating bevel gear $A^8$ fastened to a stub shaft $A^9$ supported by a bracket $A^{10}$, all as more clearly shown in Figs. 3 and 4 of the drawing. Suitably carried by a portion of the framework of the machine, as by the bracket $A^{10}$, is a friction ratchet $A^{11}$, by means of which the shafts $A^1$ and $A^2$ and corresponding feed rolls A carried thereby may be intermittently oscillated or turned in a forward direction to cause the rod or other continuous metal member 20 to be advanced at the desired rate of speed. The friction ratchet, generally indicated by reference character $A^{11}$, preferably comprises a plate $A^{12}$ keyed or otherwise fixedly carried by the stub shaft $A^9$ and provided at its periphery with an angular slot $A^{13}$ (see Fig. 5 of the drawing) in which is positioned a roller $A^{141}$. This roller is in such position as to engage the inner surface of a flange portion $A^{14}$ of the plate $A^{12}$ constituting an outer shell. $A^{15}$ constitutes an expansion spring for urging the roller $A^{141}$ into contact with the inner surface of the shell.

The shell $A^{14}$ is rigidly attached to, as by being integral with, the crank $A^{16}$. The crank $A^{16}$ is journalled for rotation on the exterior of the hub of the disk $A^{12}$, all as more clearly shown in Figs. 3, 4, 5 and 6 of the drawing. $A^{17}$ is the crank pin carried by the crank $A^{16}$. By means of the connecting rod $A^{18}$ and the crank pin $A^{17}$, the crank is connected with the continuously rotating cam plate $A^{19}$ carried by the main cam shaft 40 of the machine.

I provide suitable means for cutting or shearing the rod or other continuous metal member 20 into blanks of the desired length. I prefer that this cutting or shearing operation shall be such as to cooperate with the intermittent feeding means 30, the cutting or shearing operations being preferably carried out during the stages of rest of the intermittent feeding mechanism. For this purpose I may employ the cutting means generally designated by reference character 50 and more clearly shown in Figs. 1, 2 and 7 of the drawing. For this purpose I may employ a plurality of cutter knives, the upper of such knives being designated by reference character $B^2$ and the lower of such knives being designated by reference character $B^6$. $B^1$ indicates the opening in the upper knife $B^2$. The upper cutter knife $B^2$ is carried by a lever $B^3$ mounted for oscillation on the shaft $B^4$ carried in the adjustable bracket $B^5$ mounted on any suitable portion of the framework of the machine. The bracket $B^5$ also supports the lower cutting knife $B^6$. The upper cutting knife $B^2$, as more clearly shown in Fig. 7 of the drawing, is intended to completely embrace the rod or other continuous metal member 20, passing through the opening $B^1$ in the same. I prefer that the lower cutting knife $B^6$ shall have a substantially semicircular cutting edge so as to contact with the rod or other continuous metal member 20 through approximately 180 degrees. It will therefore be seen that the operation of the cutting mechanism serves, by the cooperation of the upper and lower cutting knives $B^2$ and $B^6$, to sever a predetermined length from the rod or other continuous metal member 20 to form the blank. At the same time the cutting operation will cause the rod 20 itself to be bent slightly downward. The free end of the rod 20 is however at all times under control of the upper cutting knife $B^2$, and when the latter returns to normal position it also returns the end of the rod into alignment with the semicircular cutting edge of the lower knife $B^6$. In this position of the free end of the rod 20 the subsequent operation of the feed rolls A causes the rod to be fed over the cutting edge of the knife $B^6$ through the opening $B^1$ in the upper cutting knife $B^2$.

The lever $B^3$ is preferably operated by means of a link $B^7$ provided with a turn buckle adjustment $B^{71}$ and operated by a cam $B^8$ fixed to the main cam shaft 40 of the machine. The link $B^7$ is attached to the lever $B^3$ by means of the member $B^9$ by means of the pin $B^{10}$ passing through the opening $B^{11}$ of the lever $B^3$.

I provide suitable means for receiving the series of blanks which have been generally designated by reference character 21 as the same are severed from the substantially continuous metal member 20. I prefer that the receiving means, generally designated by reference character 60, shall be so positioned with respect to the cutting mechanism 50 as to readily receive such blanks as they are formed by the severance of portions of pre-determined length of the rod or other continuous metal member 20. I prefer also that the receiving means 60 shall be intermittently rotated, its periods of rest corresponding to the periods of insertion of the successive blanks in the receiving member.

While various types of mechanism may be utilized for this purpose, I prefer to use the mechanism illustrated in the drawing embodying what may be termed a dial F which is located adjacent the cutting mechanism 50. The dial F preferably comprises a substantially circular body $F^1$ in which are positioned a series, here shown as eight, dies $F^2$. The dies $F^2$ are securely clamped in place in the circular body $F^1$ by any suitable means such as the caps $F^3$, all as more clearly shown in Figs. 9 and 10 of the drawing. Each of the dies $F^2$ preferably has a central opening $F^4$ of a diameter sufficient to allow the blank 21 severed from the rod 20 to be fed into the corresponding die by means of the feed rolls A. It may here be stated that since the dies $F^2$ are removable by means of the suitable manipulation of the caps or clamping members $F^3$, which are removably attached by means of the screws or other fastening means $F^{31}$, dies of any desired characteristics and having any desired diameter depending on the diameter or other dimensions of the blanks 21 cut from the rod 20 may be suitably employed.

$F^5$ indicates a backing plunger which extends into the rear portion of the opening $F^4$ of the die and which is carried by a backing pin $R^1$ contacting a cam rail $R^2$ carried in the dial housing $F^{10}$ surounding the dial $F^1$, all as more clearly shown in Fig. 9 of the drawing.

The rail $R^2$ is preferably of circular form, and is of substantially uniform height except at the heading position where said rail is cut away, as shown in Fig. 19 of the drawing, in order to allow the blank, backing plunger and the backing pin to be pushed back by the heading punch a distance sufficient to bring the rear end of the heated portion of the blank up to or slightly within the plane of the die face and after the heading operation has been performed, to return the backing pin and the blank to normal position during the further rotation of the dial.

The backing pins $R^1$ form positive stops or abutments against which the ends of the respective rods abut upon completion of the feeding operation, thereby causing the feed rolls to slip slightly along the continuous rod and insuring an accurate length of the blank. The backing pins $R^1$ also serve to take the pressure of the heading blow at the heading position, and to transmit this pressure through the rail to the frame of the machine. As the pins are pushed forward by the inclined portion $R^3$ onto the underpressed portion of the rail $R^2$, after the heading operation has been completed and during the further rotation of the dial, they serve partly to eject the work from the die and to bring the forged heads of the finished articles into the desired alignment with the pick-out finger shown in Figs. 15 and 16 of the drawing for the ejection of the finished articles from the machine.

I provide means for proper electrical connection for each of the blanks or work pieces 21, such means being preferably so constructed and arranged as to provide for suitable electrical connection for that portion only of each blank which extends beyond the face of the dial, (see Fig. 10) thus limiting the heating operation to those portions of each blank which it is desired to heat to a forging temperature and thereafter to forge. In this way the dies proper are not heated to a temperature which would tend to damage the same, as by burning and blunting the accurate edges of the dies proper. For this purpose I may provide the electrical contact means generally designated by reference character 70, one connection means being provided for each blank corresponding to each die intended to contain the same, there thus being eight such connection means, each generally designated by reference character 71. The connection means 71 preferably comprises a pair of jaws $G$ and $G^1$. These jaws are provided with the substantially semi-circular indentations 72 and 73 and receiving between them and clamping a portion of the exposed or upper end of the blank 21, are preferably pivoted about a common center $G^2$. The jaw $G$ is preferably clamped to the end of a shaft $G^3$ which is adapted to rotate within a hollow tube $G^4$. The tube $G^4$ acts as the shaft for the jaw $G^1$. The shaft $G^3$ and the tube $G^4$ surrounding the same are geared together for rotation in opposite directions by means of the gear mechanism generally designated by reference character $G^5$, as more clearly shown in Fig. 9 of the drawing.

The gear mechanism $G^5$ is adapted to oscillate the jaws $G$ and $G^1$ in opposite directions about a center of oscillation indicated by reference character $G^6$. The shaft $G^3$ carries the gear $G^7$ which meshes with broad-faced gear $G^8$. The tube $G^4$ on the other hand carries the gear $G^9$ which meshes with the gear $G^{10}$ on the rocker shaft $G^{11}$. Fastened to the rocker shaft $G^{11}$ is the gear $G^{12}$ which meshes with the broad-faced gear $G^8$. On an extension $G^{111}$ is a cam $G^{13}$ by means of which the rocker shaft $G^{11}$ may be oscillated. This oscillation of the rocker shaft $G^{11}$ causes the motion of the shaft $G^3$ and the surrounding tube $G^4$ in opposite directions, thus opening and closing the jaws $G$ and $G^1$ as desired.

The cam $G^{13}$ carries a cam roller $G^{14}$ which engages in a cam track $G^{15}$ in the jaw operating cam member $G^{16}$ which is suitably attached to the housing $F^{10}$, all as more clearly shown in Fig. 9 of the drawing.

In Fig. 8 of the drawing will be seen the conformation of the cam track $G^{15}$ which is provided in the cam member $G^{16}$, the outer portion of which is indicated by reference character $G^{17}$ and the inner portion by reference character $G^{18}$. The various cam rollers $G^{14}$ carried by the cam arms $G^{13}$ forming extensions of the rocker shaft $G^{11}$, are shown within the cam track $G^{15}$. The cam track $G^{15}$ is so arranged, as clearly shown in Fig. 8 of the drawing, that the stations $Z^1$, $Z^2$ and $Z^3$ correspond to the closed positions of the jaw members carried by the corresponding shafts $G^3$ and surrounding tubes $G^4$ at these stations, while the stations $Z^4$, $Z^5$, $Z^6$, $Z^7$ and $Z^8$ correspond to the open positions of the corresponding jaw members.

As more clearly shown in Fig. 9 of the drawing, the dial $F$ is carried by the dial shaft $H^1$ journalled in the dial housing $F^{10}$. Rigidly fastened to the rear end of the shaft $H^1$ is a plate $H^2$ carrying a series of cam rollers $H^3$ corresponding in number to the number of stages of the machine, here eight in number, so that there are eight cam rollers $H^3$. These cam rollers $H^3$ are adapted to engage with a cam $H^4$, as shown in Figs. 1 and 2 of the drawing. The cam $H^4$ is provided on its periphery with a track in the nature of an interrupted worm tooth, this track being designated by reference character $H^5$. Accordingly by the continuous operation of the cam $H^4$, the cam will cause an intermittent rotation of the cam plate $H^2$ and consequently of the entire dial $F$ and associated parts carried thereby.

In order definitely and accurately to locate and position the dial $F$ in proper or index position for each operation corresponding to each of the eight stages of the machine for a complete rotation of the dial $F$, I provide suitable positioning means generally designated by reference character 80, as more clearly shown in Fig. 1 of the drawing. Such means may, for example, comprise a lock bolt $J^1$ which is adapted to engage with locking holes $J^2$ in the side of the dial F. The lock bolt $J^1$ may be actuated in any suitable manner, as by means of a lever $J^3$ pivoted at $J^4$ to any suitable portion of the framework of the machine and actuated by means of the cam $J^5$ operated from the main cam shaft 40, all as more clearly shown in Figs. 1 and 2 of the drawing.

I provide suitable means for energizing the desired extending portions of the blanks 21, that is for supplying the same with the desired electrical current for heating such external portions to the desired forging temperature. For this purpose I may use any suitable means, such as the means generally designated by reference character 90 and comprising a plurality of pairs of electrical contact members or electrodes generally designated by reference character K. These electrical contact members or pairs of electrodes are preferably located adjacent to the portions $Z^1$, $Z^2$ and $Z^3$ in Fig. 8 of the drawing. While there are three such sets or pairs of electrical contact members or electrodes, since the same are substantially identical in construction it will be necessary to describe only one such pair. It may here further be stated that the heating operation for heating the desired external portions of the blanks 21 to the desired forging temperature is preferably conducted in a series of, here shown as three, heating stages, each of which adds an increment of heat to the portions of the blanks 21 being heated.

Turning now to the construction of the electrodes or electrical contact members, and referring now more particularly to Figs. 9, 11 and 10 of the drawing, it will be noted that the arm $K^1$ constituting one of the pair of electrodes or electrical contact members is provided with the contact point $K^2$ (see Fig. 9 of the drawing) which is adapted to engage with the outer end of the blank carried by the die. The arm $K^3$, constituting the remaining electrical contact member or electrode of the pair of electrical contact members or electrodes K under consideration, carries a similar contact point $K^4$ which is adapted to engage with the boss on the pair of jaws G and $G^1$ at the pivot $G^2$ of the same. The upper ends $K^5$ and $K^6$ of the members $K^1$ and $K^3$ are connected to the poles of an appropriate electrical transformer adapted to supply current of the desired voltage and intensity to the portions of the blanks 21 desired to be heated to a forging temperature.

It will thus be evident that by means of the members $K^1$, $K^3$ and the boss of the cooperating jaws G and $G^1$, together with the end of the blank 21 itself and the various wires and connections for the transformer, a complete circuit is established through that portion of the blank 21 which it is desired to heat to a forging temperature, such contact being established when the electrodes or electrical contact members $K^1$ and $K^3$ have been lowered into the position shown in Fig. 9 of the drawing.

The members $K^1$ and $K^3$ are independently supported, being carried and operated into and out of a heating position by means of the reciprocating rods $K^7$. These rods $K^7$ are normally impelled in a rearward direction by means of the coil expansion springs $K^8$ surrounding the respective rods $K^7$. These springs tend normally to provide resilient contact of the contacts $K^2$ and $K^4$ with the end of the work piece and the boss on the jaws G and $G^1$ respectively. The rod $K^7$ carries in its inner end a ball $K^9$ which is adapted to engage with a cam $K^{10}$ which is carried by the dial housing $F^{10}$, as more clearly shown in Figs. 9 and 10 of the drawing. Fig. 13 shows more clearly the shape of the cam $K^{10}$. It will be noted that the three portions of the same designated by reference characters $K^{101}$, $K^{102}$ and $K^{103}$. The cam $K^{10}$ is provided with a plurality of depressions $K^{111}$, $K^{122}$ and $K^{133}$. These depressions permit the series of rods $K^7$ under the action of the coil expansion springs $K^8$ to descend and thus to be brought into resilient electrical contact with the end of the work piece 21 and the boss on the jaws G and $G^1$. The three portions $K^{101}$, $K^{102}$ and $K^{103}$ of the cam $K^{10}$ correspond to the three heating stages.

The cam $K^{10}$ is, as more clearly shown in Fig. 12 of the drawing, provided with or is in the form of a circular rack having the teeth $K^{11}$ adapted to engage with pinions $K^{13}$, the pinions in turn meshing with the teeth of a horizontal rack $K^{14}$ having longitudinal motion from the main cam shaft 40 through the cam operated lever $K^{15}$ and the link $K^{16}$, all as more clearly shown in Fig. 12 of the drawing, the lower end of the link $K^{16}$ designated by reference character $K^{17}$ adapted to cooperate with the cam $K^{18}$, and the link $K^{16}$ itself being pivoted as at $K^{19}$ to any suitable portion of the machine.

When the cam $K^{10}$ is oscillated by means of the lever $K^{15}$ and its associated parts, the rods $K^7$ are forced out against the pressure of the corresponding springs $K^8$ by the unindented portions of the cam rail $K^{10}$. This causes the member $K^1$ and $K^3$ to be moved forwardly against the action of the corresponding springs $K^8$, thus elevating the contact members $K^2$ and $K^4$ away from the work piece 21 and the boss on the jaws G and $G^1$. On the other hand when the cam $K^{10}$ is oscillated in the reverse direction, the springs $K^8$ cause the corresponding rods $K^7$ to return the contacts $K^2$ and $K^4$ to their contact in position with the work piece 21 and the boss on the jaws G and $G^1$. Rods $K^{20}$ fastened in the dial housing $F^{10}$ and passing through suitable bushings carried by the members $K^1$ and $K^3$ prevent sideways displacement of these members. It may here be stated that the contact members $K^2$ and $K^4$ should be carefully insulated from the remaining parts of the machine to prevent shortcircuiting. For this reason it will be noted that an insulating bushing $K^{21}$ is provided in that part of the members $K^1$ and $K^3$ through which the aligning rods $K^{20}$ pass.

I provide means for forming the heated portions of the work pieces 21, after the same have been heated to the desired temperature by the succession of heating stages already described above. For this purpose I may utilize the means generally designated by reference character 100. The forming means 100 is preferably in alignment with the stage $Z^8$ as designated in Fig. 8 of the drawing and as more clearly shown in Figs. 1 and 2 of the drawing. Referring now more particularly to Figs. 14 to 18 inclusive of the drawing, $L^1$ indicates a heading or forming ram adapted to be oscillated backwards and forwards by a mechanism shortly to be described and to form a head on the heated end of the work piece 21 as the same is carried by the die and as the latter is indexed into the position $Z^8$. The ram $L^1$ may be of any suitable or desired construction and may be oscillated by means of the crank $L^2$ and the crank shaft $L^3$. These may be operated from the main driving mechanism for the machine as will be described later in this specification.

While various types of punch or forming mechanism may be employed, I prefer to use the mechanism shown in the drawing and comprising a punch D of any suitable form which is carried upon the face of the ram $L^1$ and adjustable punch holder $L^4$. Within the punch D is a sliding rod $L^5$ normally retracted by a coil expansion spring $L^{51}$, but capable of being advanced in the punch to act as a knock-out for work which might tend to cling in the die cavity or impression in the punch. The knock-out rod $L^5$ is adapted to be operated by a rod $L^6$, the rear end $L^{61}$ of which is beveled and which engages with the correspondingly beveled rear end $L^{71}$ of a vertical rod $L^7$ normally held upward by the coil expansion spring $L^{72}$. The vertical rod $L^7$ is adapted to be pushed down against the action of the coil expansion spring $L^{72}$ by a rocking plate $L^8$ carried by a lever $L^9$ pivoted at $L^{10}$ to any suitable portion of the framework of the machine, the arm $L^{11}$ of which is provided with the cam roller $L^{12}$ which engages with the cam track cut in the face of the gear $M^1$ carried by the corresponding shaft $L^3$.

As the punch G is withdrawn after forming a head on the blank 21, the plate $L^8$ is rocked down by the cam and thereby depresses the plunger $L^7$, causing the plunger $L^6$ to move forward to cause the knock-out rod $L^5$ to eject the work from the punch D. It should here be made clear, however, that the shank of the work remains in the eight dies $F^2$ and that the knock-out rod $L^5$ is provided merely to insure that the blank is not withdrawn accidentally from the die $F^2$ by means of the punch D.

As the punch D approaches its return position and the dial F is indexed once more, the formed blank 21 is partially ejected from the corresponding die $F^2$ by the action of the cam rail $R^2$ on the pin $R^1$ and the plunger $F^5$ abutting against the rear of the blank 21.

I provide, however, positive mechanical ejecting means for the finished blanks. While various means may be employed for this purpose, I prefer to employ the means illustrated in the drawing and comprising the following structural features: When the formed blank 21 reaches a position corresponding to stage $Z^6$, (see Figs. 15 and 16) it is engaged by a slot $N^1$ in a take-out $N^2$ adapted to completely withdraw the finished blank from the die and discharge it in its completed condition from the machine. As more clearly shown in Figs. 15 and 16 of the drawing, the take-out mechanism consists of an oscillating rod $N^3$ carrying the take-out head $N^2$ at its forward end and engaged by and journalled in a rocking lever $N^4$ at its opposite end. The rocking lever $N^4$ is fastened to a shaft $N^5$ which may be oscillated by means of the lever $N^6$, the connecting rod $N^7$ and the lever $N^8$, which latter is actuated by the cam $N^9$ cut in the inner face of the gear $M^2$.

The rod $N^3$ is provided with the longitudinally disposed gear teeth $N^{31}$ cut in its forward end and adapted to engage with the worm $N^{10}$ of the shaft $N^{10'}$. The shaft may be oscillated by any suitable mechanism, such as a link cam lever $N^{11}$ operated by a cam $N^{12}$, all as shown more clearly in Fig. 1 of the drawing.

The rod $N^3$ has therefore a combined motion or oscillation about its axis and of longitudinal reciprocation. The head of the blank is carried into the slot $N^1$ in the extractor or take-out mechanism $N^2$ by the indexing action of the dial. The oscillation of the rod $N^3$ thereupon withdraws the completed blank 21 from the die by an axial motion, and upon completion of the axial withdrawing operation, the rod $N^3$ is oscillated in order to discharge the blank from the slot $N^1$ and to cause it to fall from the control of this slot by gravity.

While any suitable means may be employed for the proper driving of the machine from any suitable external source of power, I prefer to utilize the means illustrated in the drawing and comprising a flywheel $P^1$ mounted on a cross-shaft $P^2$, to which is keyed a pinion $P^3$ engaging gears $M^1$ and $M^2$. The gears $M^1$ and $M^2$ are preferably of substantially equal diameter, the gear M³ being rigidly keyed to the crank shaft L³ for operating the ram of the machine. The gear M² is keyed to a cross-shaft P⁴ which carries on its opposite end a bevel gear P⁵ meshing with the corresponding bevel gear P⁶. The gears P⁵ and P⁶ are preferably of equal diameter. The gear P⁶ is keyed to the main cam shaft 40 of the machine, which cam shaft 40 carries the various cams already referred to. The bevel gear P⁸ on the end P⁷ of the shaft 40 preferably meshes with the bevel gear P⁹ on the shaft P¹⁰, to which is keyed a spur gear P¹¹ meshing with a spur gear P¹² keyed to the shaft P¹³. The gears P⁸ and P⁹ are preferably of substantially equal diameter, as are also gears P¹¹ and P¹². The indexing cam H⁴ already referred to is keyed to the shaft P¹³.

It will be obvious that when the flywheel P¹ is set in motion, the shafts L³, P², 40, P¹⁰, and P¹³ will all rotate at the same speed. One revolution of these shafts will complete a single blank corresponding to one of the eight stages of the machine. This is for the reason that a single revolution of these shafts will cause all of the mechanisms to go through a single cycle corresponding to a single stage or index movement of the dial.

This completes the description of the aforesaid illustrative embodiment of the present invention. The construction of said embodiment will, it is believed, be clear from the foregoing description. Likewise the operation of said embodiment will be clear from the foregoing description.

It will be apparent that the machine is comparatively simple in construction and may be readily, conveniently and economically fabricated and assembled. In use the machine is characterized by its adaptability for forming a continuous metal member, such as a rod, wire, strip, ribbon or the like, into a series of blanks which are in turn heated and forged into the desired finished articles. The heating operation is preferably conducted in a series of successive stages, each giving to the article to be heated the desired increment of heat, and the heating operation being so conducted as to avoid burning or otherwise injuring the blanks.

The heading or forming operation is accurately and expeditiously carried out, the heating effect having been substantially limited to the external portion of the blank which it is desired to form, thus protecting the die from any harmful over-heating. When the article is completed, simple means are provided for removing it from the machine in its final completed condition.

Other superiorities and advantages of the machines of the present invention will readily occur to those skilled in the art to which the present invention relates.

What I claim as my invention is:

1. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature.

2. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature, said heating means comprising a plurality of pairs of electrodes, and intermittently operable means for bringing one electrode of each of said pairs of electrodes into electrical heating contact with a particular blank.

3. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means for limiting the substantial heating action of each pair of electrodes to an end portion of the corresponding blank extending beyond the corresponding die cavity.

4. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means for shunting the electrical heating current away from the dial and the die cavities therein to prevent harmful heating effect on said dial and die cavities.

5. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means comprising a plurality of pairs of electrically conductive cooperating oscillatable jaws and a plurality of bosses, one adjacent the pivot point of each pair of cooperating jaws for cooperating with each metal blank for limiting the substantial heating action of each pair of electrodes to an end portion of the corresponding blank extending beyond the corresponding die cavity.

6. In a machine for heating and forging metal articles, a dial member provided with a plurality of die cavities, means for intermittently rotating said dial member, intermittently operable means for inserting metal blanks into said die cavities successively, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means comprising a plurality of pairs of electrically conductive jaws and means including a plurality of pairs of concentric shafts, at least one of which is hollow for oscillating said jaws and a boss adjacent the pivot point of each pair of cooperating jaws for cooperating with each metal blank for shunting the electrical heating current away from the dial and the die cavities therein to prevent harmful heating effect on said dial and die cavities.

7. In a machine for heating and forging metal articles, a dial member provided with a plurality of die cavities, means for intermittently rotating said dial member, means for intermittently feeding a continuous metal member, intermittently operable means for inserting the end of said metal member into said die cavities successively, means for intermittently shearing the same into metal blanks of predetermined lengths, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means for limiting the substantial heating action of each pair of electrodes to an end portion of the corresponding blank extending beyond the corresponding die cavity.

8. In a machine for heating and forging metal articles, a dial member provided with a plurality of die cavities, means for intermittently rotating said dial member, means for intermittently feeding a continuous metal member and for intermittently shearing same into metal blanks of predetermined lengths, intermittently operable means for inserting the metal blanks so formed into said die cavities successively, and means for heating a plurality of said blanks simultaneously and any particular blank in a plurality of successive heating stages to bring a predetermined portion of the same to a forging temperature, said heating means comprising a plurality of pairs of electrodes, and intermittently operable means for bringing one electrode of each of said pairs of electrodes into electrical heating contact with a particular blank.

9. In a machine for heating and forging metal articles, a dial member provided with a plurality of die cavities, means for intermittently rotating said dial member, means for intermittently feeding a continuous metal member and for intermittently shearing the same into metal blanks of predetermined lengths, intermittently operable means for inserting the metal blanks so formed into said die cavities successively, and means for heating a plurality of said blanks simultaneously and any particular blank in a plurality of successive heating stages to bring a predetermined portion of the same to a forging temperature.

10. In a machine for heating and forging metal articles, a dial member provided with a plurality of die cavities, means for intermittently rotating said dial member, means for intermittently feeding a continuous metal member toward said dial member, intermittently operable means for inserting the end of said metal member into said die cavities successively, means for intermittently shearing the same into metal blanks of predetermined lengths, and means for heating a plurality of said blanks simultaneously and any particular blank in a plurality of successive heating stages to bring a predetermined portion of the same to a forging tempearture, said heating means comprising a plurality of pairs of electrodes, intermittently operable means for bringing one electrode of each of said pairs of electrodes into electrical heating contact with a particular blank, and means comprising a plurality of pairs of electrically conductive jaws and means including a plurality of pairs of concentric shafts, at least one of which is hollow for oscillating said jaws and a boss adjacent the pivot point of each pair of cooperating jaws for cooperating with each metal blank for shunting the electrical heating current away from the dial and the die cavities therein to prevent harmful heating effect on said dial and die cavities.

11. In a machine for heating and forging metal articles, a dial member provided with a plurality of die cavities, means for intermittently rotating said dial member, means for intermittently feeding a continuous metal member toward said dial member, intermittently operable means for inserting the end of said metal member into said die cavities successively, means for intermittently shearing the same into metal blanks of predetermined lengths, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means comprising a plurality of pairs of electrically conductive cooperating oscillatable jaws and a plurality of bosses, one adjacent the pivot point of each pair of cooperating jaws for cooperating with each metal blank for limiting the substantial heating action of each pair of electrodes to an end portion of the corresponding blank extending beyond the corresponding die cavity.

12. In a machine for heating and forging metal articles, a dial member provided with a plurality of die cavities, means for intermittently rotating said dial members, means for intermittently feeding a continuous metal member toward such dial member, intermittently operable means for inserting the end of said metal member into said die cavities successively, means for intermittently shearing the same into metal blanks of predetermined lengths, and means for heating a plurality of said blanks simultaneously and any particular blank in a plurality of successive heating stages to bring a predetermined portion of the same to a forging temperature, said heating means comprising a plurality of pairs of electrodes, intermittently operable means for bringing one electrode of each of said pairs of electrodes into electrical heating contact with a particular blank, and means for shunting the electrical heating current away from the dial and the die cavities therein to prevent harmful heating effect on said dial and die cavities.

13. In a machine for heating and forging metal articles, a dial member provided with a plurality of die cavities, means for intermittently rotating said dial member, intermittently operable means for inserting metal blanks into said die cavities successively, means for heating a plurality of said blanks simultaneously and any particular blank in a plurality of successive heating stages to bring a predetermined portion of the same to a forging temperature, and means for forging said predetermined heated portion of each of said blanks successively while in their respective die cavities.

In testimony whereof, I have signed my name to this specification this 15th day of August, 1927.

PENROSE R. HOOPES.